UNITED STATES PATENT OFFICE.

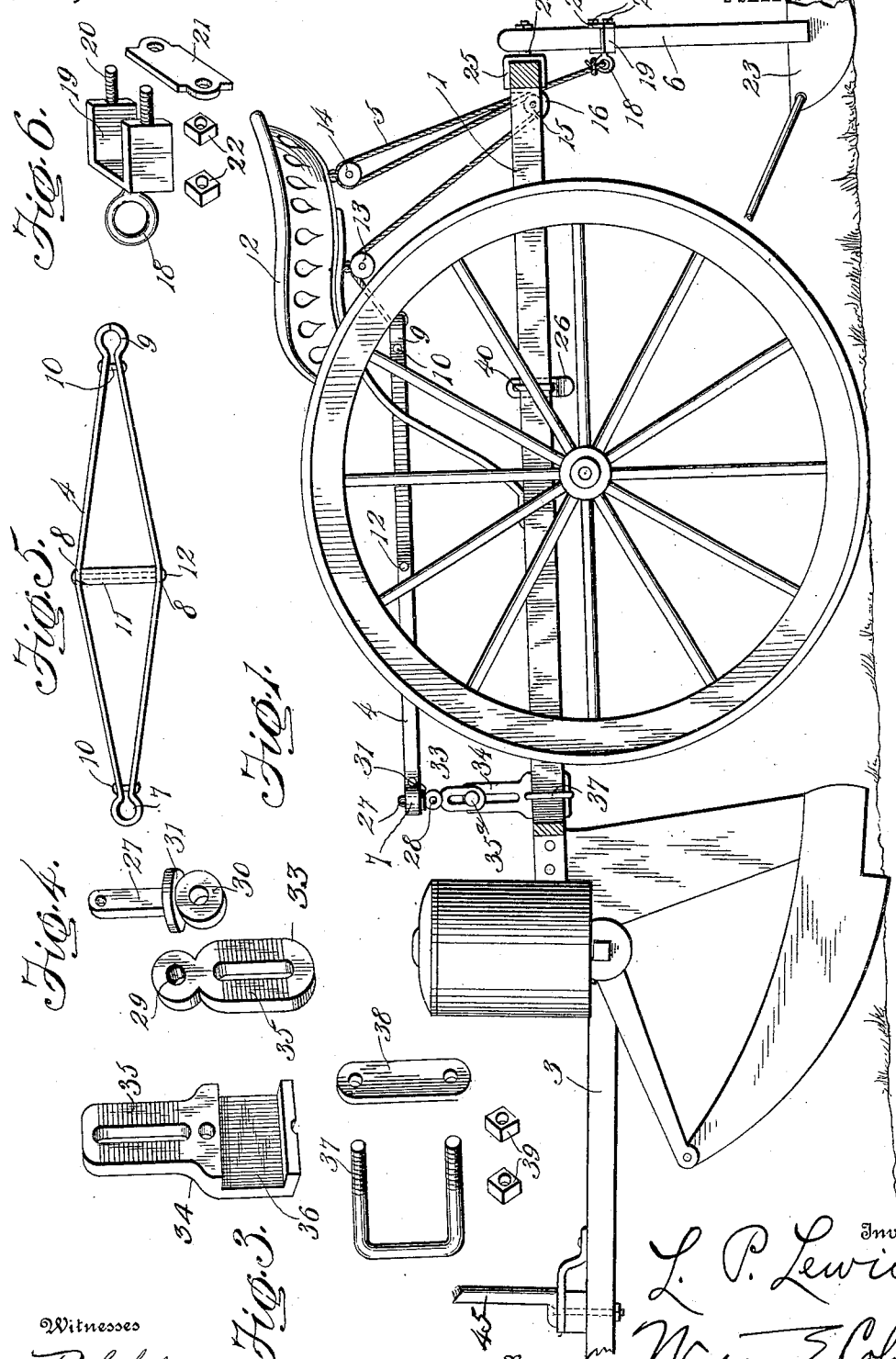

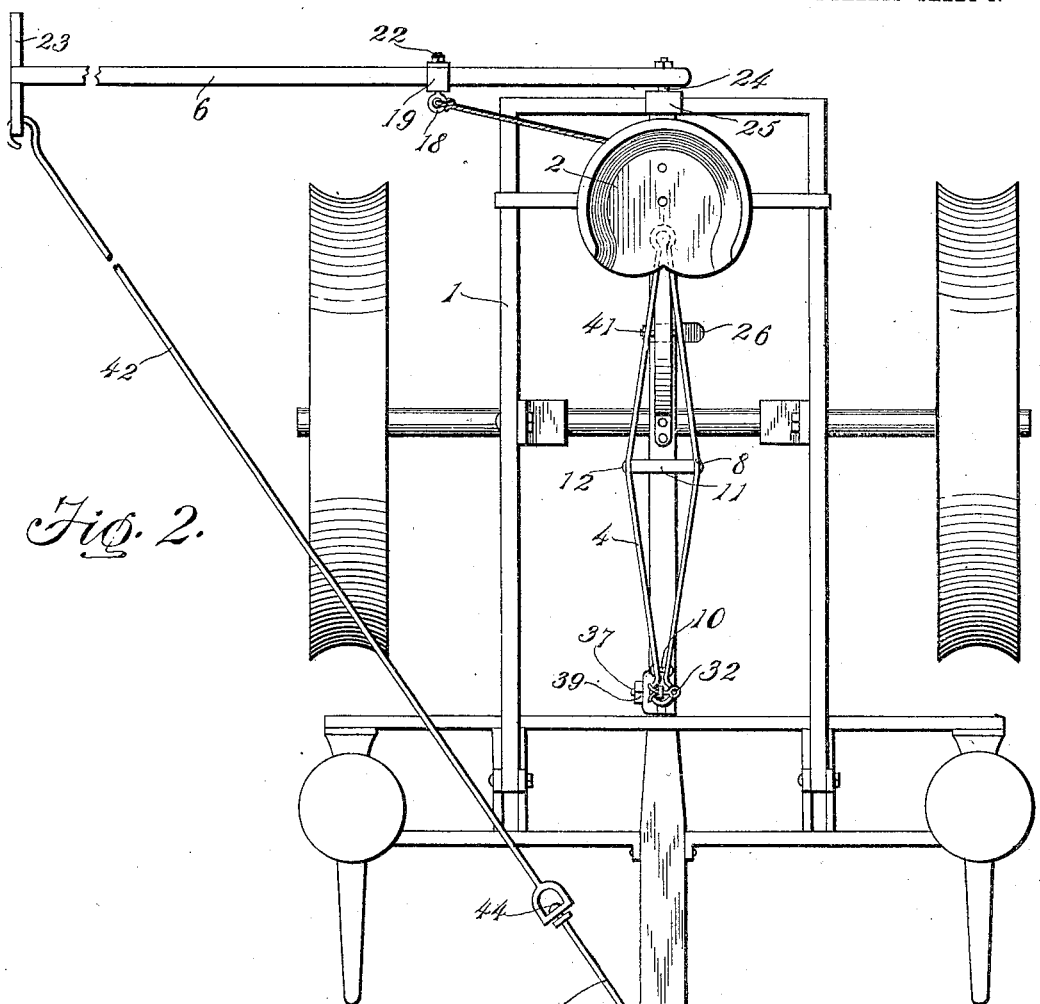
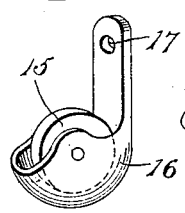
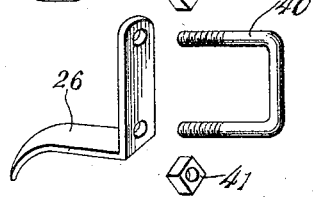

LEANDER P. LEWIS, OF CENTRALIA, MISSOURI.

MARKING ATTACHMENT FOR CORN-PLANTERS.

938,389.   Specification of Letters Patent.   Patented Oct. 26, 1909.

Application filed December 21, 1908. Serial No. 468,611.

*To all whom it may concern:*

Be it known that I, LEANDER P. LEWIS, a citizen of the United States, residing at Centralia, in the county of Boone and State of Missouri, have invented certain new and useful Improvements in Marking Attachments for Corn-Planters, of which the following is a specification, reference being had to the accompanying drawings.

This invention relates to improvements in row marking devices for corn planters and the like.

The object of the invention is to provide a simple and practical marking device in the form of an attachment which may be produced at a small cost and readily applied to any planters now in general use and which may be easily and effectively controlled by a single foot lever of novel construction and having novel means for mounting it and holding it in a depressed position to maintain the marker in an elevated or inoperative position.

With the above and other objects in view, the invention consists of the novel features of construction and the combination and arrangement of parts hereinafter fully described and claimed, and illustrated in the accompanying drawings, in which—

Figure 1 is a side elevation, with parts broken away and in section, of a corn planter having the improved row marking device or attachment applied thereto; Fig. 2 is a detail plan view of the same; Fig. 3 is a perspective view of the clamp showing its several parts separated; Fig. 4 is a detail view showing the pivoted parts of the fulcrum standard for the lever; Fig. 5 is a plan view of the lever; Fig. 6 is a detail perspective view of the connection for fastening the cord to the marker arm or carrier, the parts of the connection or fastener being separated; Fig. 7 is a detail perspective view of the pulley and its block which are mounted on the frame of the planter; and Fig. 8 is a detail perspective of the device for holding the lever in its depressed position to maintain the marker elevated.

In the drawings 1 denotes a portion of the frame of a corn planter or the like of ordinary form and construction, 2 denotes the driver's seat and 3 denotes the draft tongue or pole to which the draft animals are attached.

The invention comprises a foot lever 4 arranged horizontally and longitudinally above the frame 1 and in advance of the seat 2 and having its forward end suitably fulcrumed to the frame and its rear end connected to a cord 5 or other flexible element which is passed over suitably arranged guide pulleys or equivalent devices and attached to a marker carrier 6. The lever 4 may be mounted on any suitable portion of the main frame of the planter but is preferably carried by the central longitudinal bar of said frame, as shown in Figs. 1 and 2 of the drawings. The lever 4 is preferably constructed, as clearly shown in Fig. 5, by taking a metal strap, bending it upon itself at its center to provide a pivot eye 7, then bending its arms angularly in opposite directions at their centers, as shown at 8, to provide a diamond-shaped frame and then bending their extremities into oppositely disposed semi-circular portions to provide a second eye 9. Rivets or similar fastenings 10 are passed through the side portions or arms of the lever adjacent its eyes 7, 9 so as to make it rigid and a spacing sleeve 11 and a centrally arranged rivet or bolt 12 are arranged between the angular portions 8 of said arms or sides of the lever to further strengthen the latter and to provide a foot piece.

One end of the cord 5 is attached to the eye 9 and its intermediate portion is passed, as clearly shown in Fig. 1, over two guide pulleys 13, 14 passing beneath the seat 2 and over a third guide pulley 15 journaled in a semi-circular block 16 having an attaching shank 17 which is fastened by a bolt to the rear part of the planter frame 1. The other end of the cord 5 is attached to an eye 18 upon a U-shaped fastener 19 adapted to straddle an arm or lever which constitutes the marker carrier 6. The arms of the U-shaped fastener or connection 19 have threaded stems 20 to pass through apertures in a retaining plate 21 and receive clamping nuts 22 whereby said fastener may be clamped upon the lever 6 at any distance from its fulcrum.

The marker carrier arm or lever 6 is of ordinary form having a marking shoe or head 23 at its outer end and its inner end is fulcrumed on a pivot stud 24 projecting rearwardly from a U-shaped clamping member secured centrally upon the rear bar of the frame 1, as shown in Figs. 1 and 2 of the drawings. The construction of this clamp 25 is preferably similar to that of the fastener 19 shown in detail in Fig. 6 of the drawings.

The forward end of the lever 4 is fulcrumed so that it can swing vertically to draw upon the cord 5 to elevate the marker carrier, and also to swing horizontally so that when depressed it can be caught under a keeper hook or projection 26 suitably arranged upon the frame 1 and thereby be maintained in such depressed position to hold the marker carrier in an elevated or inoperative position. Said mounting of the lever is preferably effected by providing a vertical pivot 27 to enter the eye 7 of the lever and which allows the lever to swing horizontally and a horizontal pivot 28 on which the lever swings vertically. The pivot 28 is in the form of a pin or bolt passed through two eyes 29, 30, the former of which is carried by a suitable bracket arm or standard attached to the planter frame and the latter of which is formed upon the lower end of the pin which forms the pivot 27. Said pin or pivot 27 has an annular stop collar 31 arranged just above its eye 30 and on which the eye 7 of the lever is adapted to rest, and it is retained in said eye 7 by a split pin 32 or any equivalent means. The bracket arm or standard which carries the eye 29 is preferably made vertically adjustable by forming it of two overlapping slidably engaged sections 33, 34, the former of which carries the eye 29 and the latter of which carries a clamp for engagement with one of the bars of the planter frame 1. Said standard sections 33, 34 are in the form of vertically or longitudinally slotted plates, the opposing and contacting faces of which are corrugated, as shown at 35, or otherwise roughened to prevent them from slipping upon each other when engaged and fastened in adjusted position by a bolt 35ª, which latter passes through the slots in said sections. The clamp is formed by enlarging the lower end of the section 34 and channeling the same, as shown at 36, so as to receive one of the bars of the frame 1, and by providing a U-shaped bolt 37 to straddle such bar and to pass through openings or recesses in said channeled enlargement 36. The threaded ends of the bolt 37 pass through apertures in a clamping plate 38 and receive retaining nuts 39, as will be understood upon reference to Fig. 3. This construction, it will be observed, enables the device to be readily applied to any kind of corn planter or the like and to be adjusted so that the foot lever 4 will be properly positioned with respect to the driver's seat.

The keeper hook 26 is preferably in the form of an angular bracket, one arm of which is curved to provide a retaining projection with which the lever may be engaged and the other end or arm of which is adapted to engage one of the bars of the planter frame 1 and is apertured to receive a U-shaped fastening bolt 40, which straddles such bar and receives retaining nuts 41. While this is the preferred manner of constructing and fastening the keeper 26, it will be understood that any equivalent device may be employed in lieu of it.

In order to brace the outer end of the marker carrier 6 and to remove the strain from its fulcrum pin or pivot 24 a brace rod or link consisting of two sections 42, 43 is provided. Said sections are connected by a swivel, as shown at 44, and one of them has a hook to engage an eye in the shoe 23 and the other end of which has a hook to engage a similar eye in the upper end of a standard 45 which rises from the draft tongue 3 and which, if desired, may be fastened to the same by the pivot bolt which fastens the doubletree to said tongue, as shown in Fig. 1 of the drawings.

In operation, assuming the parts to be in their normal operative position shown in Figs. 1 and 2, when the driver desires to elevate the marker to an inoperative position, he places his foot upon the foot piece 11 of the lever 4 and presses downwardly to depress the latter, whereupon the cord 5 is drawn upon to swing the marker carrier 6 upwardly. By shifting the lever laterally or horizontally after it is depressed beneath the plane of the keeper hook 26, it may be engaged with the latter and thereby retained in its lowered position so that the marker carrier will be maintained in an elevated or inoperative position without the driver keeping his foot upon the lever.

The device is exceedingly simple in construction and may therefore be produced at a small cost and will be easy to apply to any kind of planter and exceedingly strong and durable in use. It may be conveniently operated and completely controlled by one foot lever and when the latter is depressed to elevate the marker shoe it does not interfere with the operation of the planter shoe as in most devices of this character.

While I have shown and described the preferred embodiment of my invention, it will be understood that I do not wish to be limited to the precise construction set forth and that various changes in the form, proportion and minor details of construction may be resorted to without departing from the spirit and scope of the invention.

Having thus described the invention what is claimed is:

1. In a planter, a transversely extending marker carrying arm pivoted at its inner end to the planter for vertical swinging movement, a foot lever having one end fulcrumed to permit its other end to swing in both vertical and horizontal planes, said foot lever having a foot piece intermediate its ends, an operative connection between the free or swinging end of said lever and the marker arm, whereby the latter will be elevated when the foot lever is depressed and a keeper with which the foot lever is engaged to maintain the marker arm elevated.

2. In a planter, a swinging marker carrier, guides, a flexible element engaged with the guides and adapted to operate the carrier, a keeper hook, a foot lever having said element connected to its free end, and means for mounting the lever for both vertical swinging movement and horizontal swinging movement whereby when it is depressed it will elevate the marker carrier and when swung horizontally under the keeper hook it will be retained in its depressed position to maintain the marker carrier elevated.

3. In a planter, a marker carrier, a foot lever for operating the same having a diamond-shaped frame with eyes at its ends and with an intermediate bracing element forming a foot piece, means connected to one eye of the lever for operating the marker carrier, a vertical pivot pin arranged in the other eye of the lever to permit the latter to swing horizontally, a support carrying a horizontal pivot pin on which the vertical pivot pin is rotatable whereby the lever is permitted to swing vertically and a keeper for the lever.

4. In a planter, a transversely extending marker carrying arm pivoted for vertical swinging movement, a lever for elevating the marker carrying arm, a vertical pivot pin on which the lever is arranged for horizontal swinging movement, a horizontal pivot pin on which the vertical pin is arranged to permit the lever to swing vertically, a support for said horizontal pin, and a keeper adapted to be engaged by the lever when the latter is depressed to maintain the marker carrying arm elevated.

5. In a planter, a marker carrier, a lever for operating the same, a vertical pivot pin on which the lever is arranged to swing horizontally, a horizontal pin on which the vertical pin is mounted to permit the lever to swing vertically, a support for the horizontal pin, means whereby said support may be adjusted vertically, and a keeper for the lever to hold the marker elevated.

6. In a planter, a transversely disposed marker carrying arm pivoted for vertical swinging movement, a longitudinally disposed foot lever having a foot piece intermediate its ends, guides, a flexible element engaged with said guides and connected to the free end of the lever and to said marker carrying arm, a standard consisting of overlapping longitudinally slotted sections, a clamping bolt in the slots of said sections to maintain them in adjusted position, means for fastening one of the sections to the planter and means for mounting the lever upon the other section.

7. In a planter, a transversely disposed marker carrying arm pivoted for vertical swinging movement, a longitudinally disposed foot lever having a foot piece intermediate its ends, guides, a flexible element engaged with said guides and connected to the free end of the lever and to said marker carrying arm, a standard consisting of overlapping longitudinally slotted sections, a clamping bolt in the slots of said sections to maintain them in adjusted position, means for fastening one of the sections to the planter, a horizontal pivot upon the other section, a vertical pivot for the lever mounted upon the horizontal pivot, and a keeper to be engaged by the lever when depressed to hold the marker carrying arm elevated.

8. In a planter, a marker carrier, a lever for operating the same, a vertically extensible standard consisting of overlapping longitudinally slotted upper and lower sections, the lower section having one face channeled to receive the frame of the planter and also apertured, a U-shaped clamping bolt to straddle the frame of the planter and enter the apertures in the lower section of the standard to clamp said section to the planter frame, a clamping bolt arranged in the overlapping slotted portions of the two sections of the standard to hold them in adjusted position and a fulcrum for the lever carried by the upper section.

9. In a planter, a marker carrier, a foot lever for operating the same, means for mounting the lever for swinging movement in both vertical and horizontal planes, and a keeper to be engaged by the lever when depressed to hold the marker carrier elevated, said keeper consisting of an angular member having a downwardly curved, hook-shaped end and a vertically disposed apertured end, and a U-shaped bolt engaged with a portion of the frame of the planter and arranged in the apertures of said upright end of the angular member or keeper.

In testimony whereof I hereunto affix my signature in the presence of two witnesses.

LEANDER P. LEWIS.

Witnesses:
 W. C. JENNINGS,
 E. R. DENHAM.